US011913491B2

(12) United States Patent
Naito

(10) Patent No.: US 11,913,491 B2
(45) Date of Patent: Feb. 27, 2024

(54) COUPLING STRUCTURE

(71) Applicant: SUBARU CORPORATION, Tokyo (JP)

(72) Inventor: Tetsu Naito, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 1272 days.

(21) Appl. No.: 16/160,593

(22) Filed: Oct. 15, 2018

(65) Prior Publication Data

US 2019/0136887 A1  May 9, 2019

(30) Foreign Application Priority Data

Nov. 9, 2017  (JP) .................................. 2017-216635

(51) Int. Cl.
- F16B 5/08 (2006.01)
- F16B 11/00 (2006.01)
- B23K 20/10 (2006.01)
- B23K 20/12 (2006.01)

(52) U.S. Cl.
CPC ................ F16B 5/08 (2013.01); B23K 20/10 (2013.01); B23K 20/12 (2013.01); F16B 11/004 (2013.01)

(58) Field of Classification Search
CPC .. F16B 5/08; F16B 9/01; F16B 11/004; Y10T 403/477; B29C 65/06; F02M 35/0201; F02M 35/048; F02M 35/10288; F02M 35/104
See application file for complete search history.

(56) References Cited

U.S. PATENT DOCUMENTS

| 6,192,849 | B1 * | 2/2001 | Powell | F02B 75/22 |
| | | | | 123/184.34 |
| 6,267,093 | B1 * | 7/2001 | Lohr | F02M 35/1036 |
| | | | | 264/328.2 |
| 6,363,900 | B1 * | 4/2002 | Homi | F02M 35/10347 |
| | | | | 123/184.21 |
| 6,851,561 | B2 * | 2/2005 | Wu | B01J 41/20 |
| | | | | 210/488 |
| 6,988,478 | B2 * | 1/2006 | Tanikawa | B29C 66/8322 |
| | | | | 123/184.42 |
| 7,174,873 | B2 * | 2/2007 | Uematsu | B29C 66/972 |
| | | | | 123/184.61 |

(Continued)

FOREIGN PATENT DOCUMENTS

| GB | 2279035 A | * 12/1994 | ............ B29C 65/06 |
| JP | 2006-095730 A1 | 4/2006 | |

(Continued)

OTHER PUBLICATIONS

Japanese Office Action, dated Sep. 17, 2019, in Japanese Application No. 2017-216635 and English Translation thereof.

*Primary Examiner* — Michael P Ferguson
*Assistant Examiner* — Kevin J Baynes
(74) *Attorney, Agent, or Firm* — MCGINN I.P. LAW GROUP, PLLC

(57) ABSTRACT

A coupling structure includes a welding member formed of resin and a welded member that is formed of resin and to which the welding member is welded. In the welding member, a region that is welded to the welded member on the rear side in a predetermined direction is smaller than a region that is welded to the welded member on the front side in the predetermined direction.

12 Claims, 6 Drawing Sheets

(56) References Cited

U.S. PATENT DOCUMENTS

| | | | |
|---|---|---|---|
| 7,270,102 B2* | 9/2007 | Tanikawa | B29C 65/069 |
| | | | 123/184.42 |
| 7,753,022 B2* | 7/2010 | Tanikawa | B29C 66/8322 |
| | | | 123/184.21 |
| 8,091,526 B2* | 1/2012 | Tanikawa | B29C 66/8322 |
| | | | 123/184.21 |
| 10,086,562 B2* | 10/2018 | Ono | B32B 3/30 |
| 10,375,846 B2* | 8/2019 | I | B29C 66/12469 |
| 10,507,618 B2* | 12/2019 | Mori | B29C 66/5472 |
| 2003/0024496 A1* | 2/2003 | Tachibana | F02M 35/1165 |
| | | | 123/184.47 |
| 2005/0225121 A1* | 10/2005 | Schoemann | B60H 1/243 |
| | | | 296/208 |
| 2006/0068161 A1 | 3/2006 | Enokida et al. | |
| 2008/0156412 A1 | 7/2008 | Enokida et al. | |
| 2009/0166921 A1 | 7/2009 | Jacob et al. | |
| 2015/0246480 A1 | 9/2015 | Sano | |
| 2016/0271868 A1* | 9/2016 | Ono | B32B 3/30 |
| 2018/0093421 A1* | 4/2018 | Mori | F16L 9/22 |
| 2019/0010899 A1* | 1/2019 | Itagaki | F02M 55/025 |
| 2019/0120192 A1* | 4/2019 | Naganawa | F02F 7/007 |
| 2019/0368524 A1* | 12/2019 | Fujiwara | B23K 26/322 |

FOREIGN PATENT DOCUMENTS

| | | |
|---|---|---|
| JP | 2007-326398 A | 12/2007 |
| JP | 2016-173157 A | 9/2016 |
| WO | WO 2015/012335 A1 | 1/2015 |

\* cited by examiner

COUPLING STRUCTURE

CROSS-REFERENCE TO RELATED APPLICATIONS

The present application claims priority from Japanese Patent Application No. 2017-216635 filed on Nov. 9, 2017, the entire contents of which are hereby incorporated by reference.

BACKGROUND

1. Technical Field

The present invention relates to a coupling structure.

2. Related Art

There is known a technique in which, in a vehicle, for instance, two metallic plates support an engine on a front frame that is welded so as to be capable of peeling-fracture and, in the event of a collision of the vehicle, a mount is subjected to peeling-fracture, thereby decoupling the coupling between the engine and the front frame (see, for instance, Japanese Unexamined Patent Application Publication No. 2007-326398).

SUMMARY OF THE INVENTION

An aspect of the present invention provides a coupling structure that includes a welding member formed of resin and a welded member that is formed of resin and to which the welding member is welded, in which, in the welding member, a region that is welded to the welded member on the rear side in a predetermined direction is smaller than a region that is welded to the welded member on the front side in the predetermined direction.

DETAILED DESCRIPTION

Some examples of the present invention will be described below in detail with reference to the attached drawings. Dimensions, materials, and numerals used in the examples are presented just to facilitate understanding of the present invention and are not intended to place restrictions on the present invention, unless otherwise stated. The drawings are schematic and are not intended to be drawn to scale. Note that, in this description and the drawings, components having substantially the same function or structure have the same symbol or numeral, and redundant descriptions are therefore omitted. In addition, illustrations of components that are not directly related to the present invention are omitted.

In some vehicles, members formed of resin are welded to each other and a coupling between the welded members is formed to have a specific strength. In some cases, however, when subjected to an external force in the event of, for instance, a vehicle collision, the coupling between the welded members is preferably decoupled, thereby protecting other components of the vehicle from damage.

It is desirable to provide a coupling structure that can provide a welding strength and protect a component intended for protection from damage when subjected to an external force.

First Example

Figure 1:
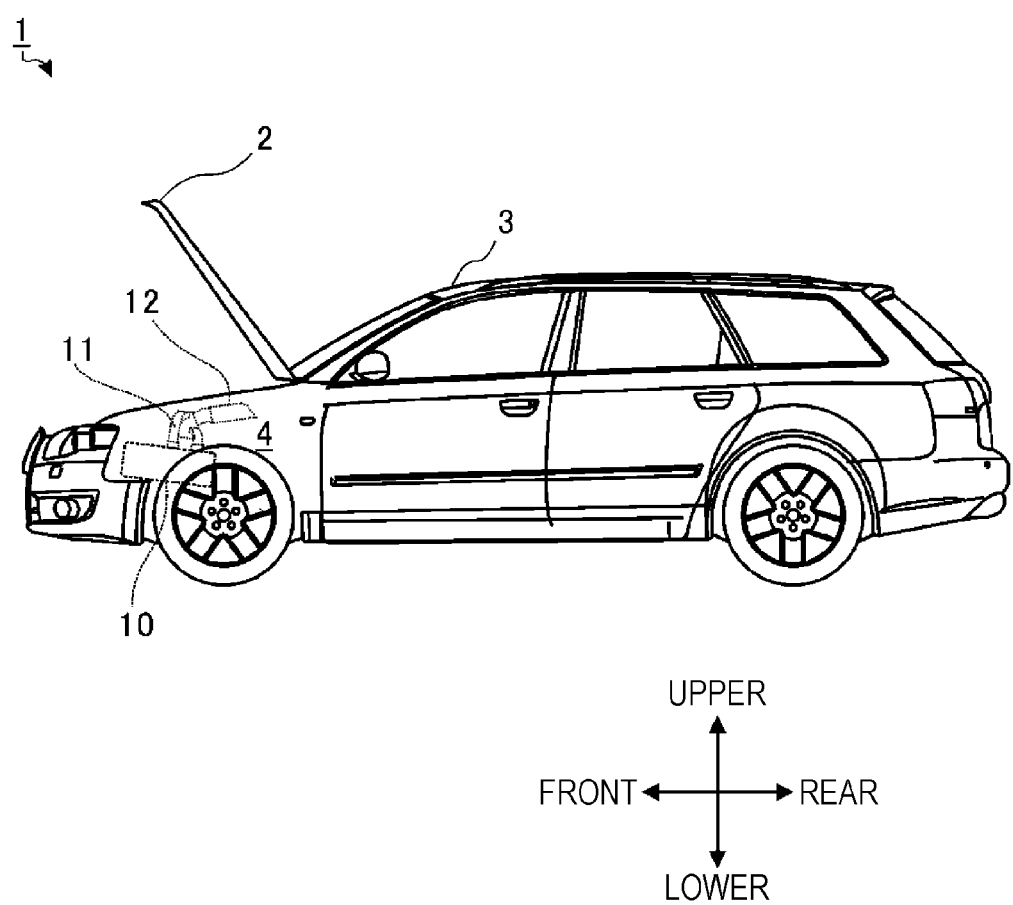
FIG. 1 is a side view of a vehicle.

FIG. 1 is a side view of a vehicle 1. In the description that follows, the direction in which the vehicle 1 travels forward is defined as "front", the direction in which the vehicle 1 reverses is defined as "rear", the upper side in the vertical direction is defined as "upper", the lower side in the vertical direction is defined as "lower", the right side of the direction of travel is defined as "right", and the left side of the direction of travel is defined as "left".

As illustrated in FIG. 1, the vehicle 1 has a hood 2 and the like mounted on a body frame 3. In addition, the vehicle 1 has an engine compartment 4 formed in the front section thereof. The engine compartment 4 is enclosed by the hood 2 and the body frame 3 and has an engine 10, an intake manifold 11, an intercooler 12, and the like disposed therein.

The intake manifold 11 is connected to the engine 10 and supplies air to the engine 10 therethrough. In addition, through the combustion of a mixture of the supplied air and fuel supplied through an injector (not illustrated), the engine 10 produces motive power that is used to power the vehicle 1. The engine 10 is secured to the body frame 3 substantially in the middle of the engine compartment 4.

The intake manifold 11 is connected at one side thereof to the intercooler 12 and diverges at the other side into a plurality of ports that are connected to a respective plurality of intake ports formed in the engine 10. The intake manifold 11 is provided on the upper part of the engine 10 and is connected to the intake ports of the engine 10 that open upward.

The intercooler 12 cools air compressed by a turbocharger (not illustrated) and supplies the compressed air to the engine 10 through the intake manifold 11. The intercooler 12 is supported on the intake manifold 11 so as to be located behind the intake manifold 11 at a position higher than the intake manifold 11.

Figure 2A:
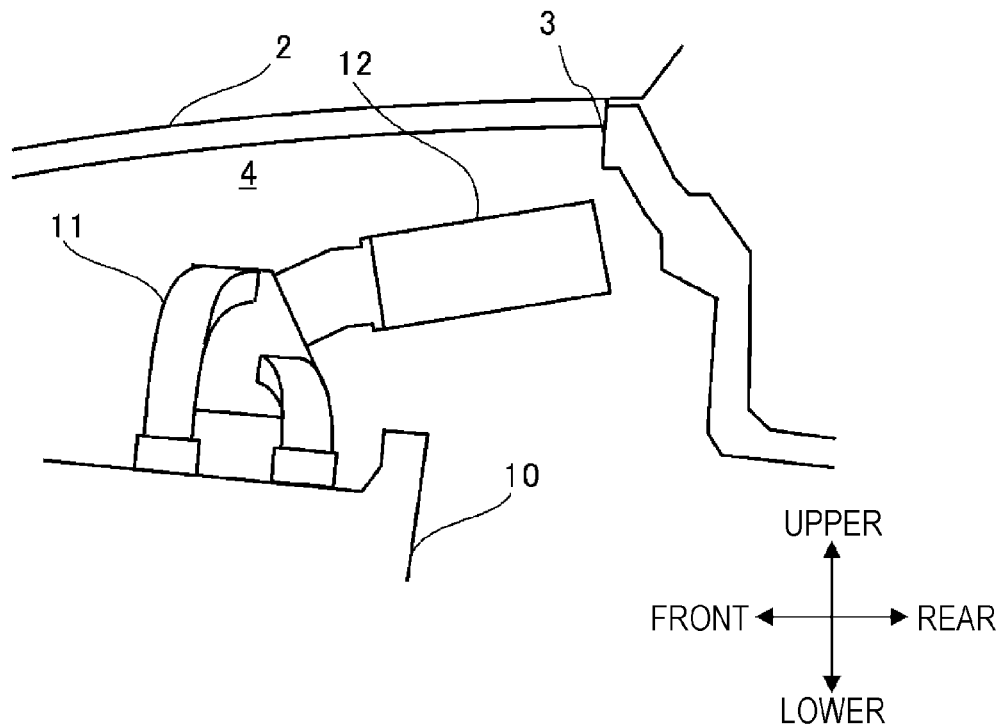
FIGS. 2A and 2B are explanatory diagrams illustrating how an engine and an intercooler are displaced during a collision of a vehicle.
Figure 2B:
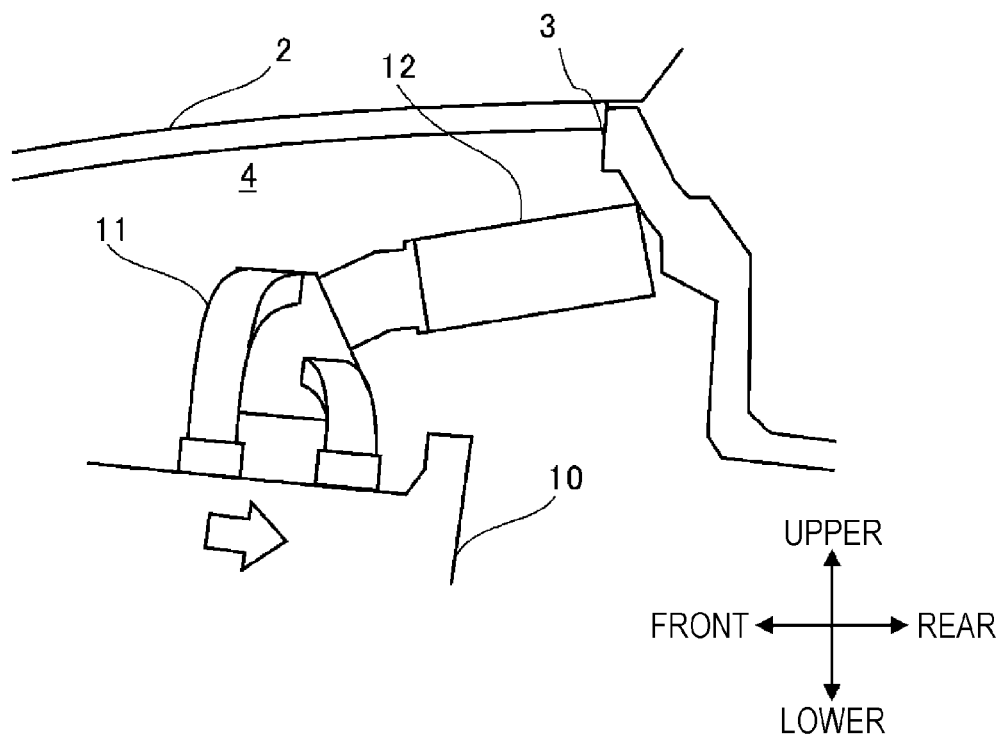

FIGS. 2A and 2B are explanatory diagrams illustrating how the engine 10 and the intercooler 12 are displaced during a collision of the vehicle 1. FIG. 2A is a side view of the engine compartment 4 taken before the collision of the vehicle 10. FIG. 2B is a side view of the engine compartment 4 taken after the collision of the vehicle 1.

As illustrated in FIGS. 2A and 2B, the intercooler 12 is disposed in the rear section of the engine compartment 4 so as to be close to the body frame 3 constituting the engine compartment 4. The intake manifold 11 is disposed in front of the intercooler 12. The engine 10 is disposed below the intake manifold 11 so as to be located in front of and below the intercooler 12.

If the vehicle 1 in which the engine 10, the intake manifold 11, and the intercooler 12 are disposed as described above collides head-on, the engine 10 is displaced rearward due to an impact force resulting from the collision. At this time, since the intake manifold 11 is secured to the engine 10 and the intercooler 12 is supported on the intake manifold 11, the intake manifold 11 and the intercooler 12 are also displaced rearward in conjunction with the displacement of the engine 10.

As a result, the intercooler 12 comes into contact with the body frame 3 located therebehind, as illustrated in FIG. 2B. At this time, the intercooler 12 is displaced forward relative to the intake manifold 11, which results in an external force being exerted on the coupling with the intake manifold 11 in the forward direction (or in a predetermined direction). In other words, the external force is exerted on the coupling with the intake manifold 11 from the rear to the front (in the rear-to-front direction). As a result, the intake manifold 11 is likely to break due to the external force exerted by the intercooler 12.

A coupling structure 200 (see FIG. 3) according to a first example reduces the likelihood of the intake manifold 11 breaking when an external force is exerted on the intercooler 12.

Figure 3:
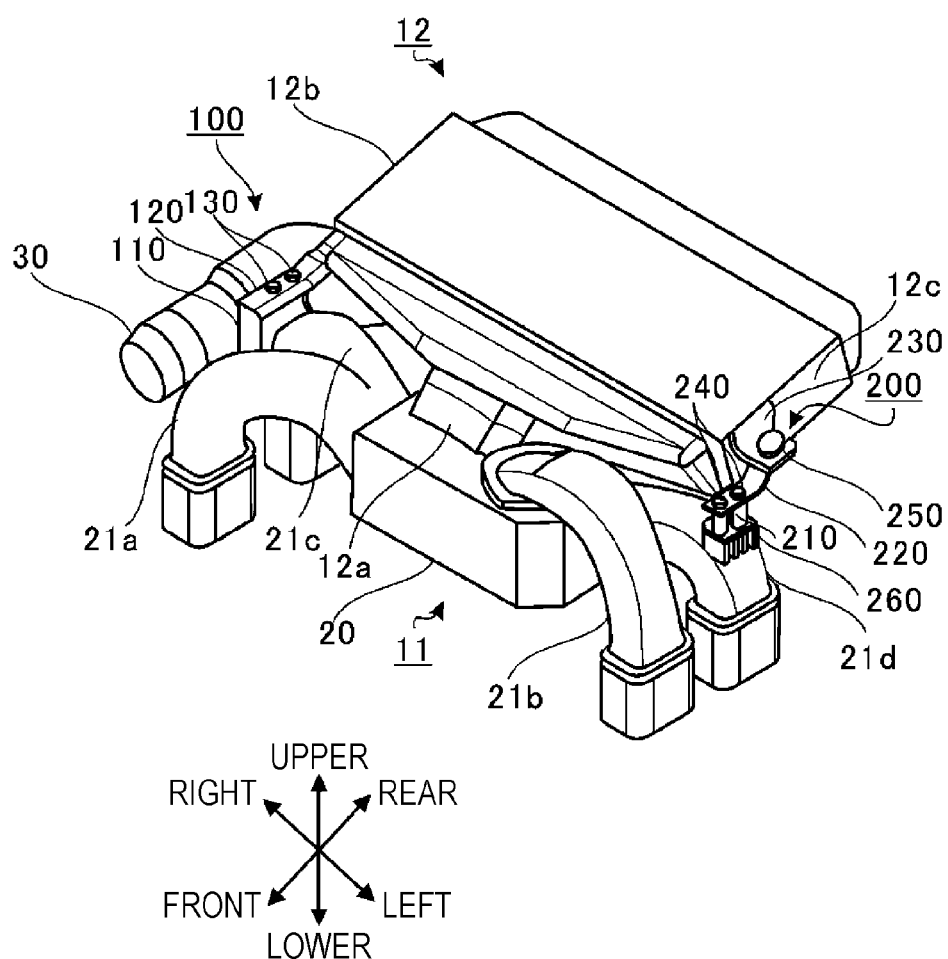
FIG. 3 is a perspective view illustrating structures of an intake manifold and an intercooler.

FIG. 3 is a perspective view illustrating structures of the intake manifold 11 and the intercooler 12.

As illustrated in FIG. 3, the intake manifold 11 includes an inter collector 20 and intake branches 21a through 21d that are formed of resin and are permanently attached to the intake manifold 11. The inter collector 20 is connected to the intercooler 12 through which air enters.

The intake branches 21a through 21d are connected to four branch holes formed in the inter collector 20, respectively, two of the branch holes being formed on the right side of the inter collector 20 and the other two being formed on the left side. The intake branches 21a through 21d are connected to the respective intake ports of the engine 10 and supply air entering the inter collector 20 to the engine 10 therethrough.

The intercooler 12 receives air compressed by the turbocharger (not illustrated) through a suction path 30. In addition, the intercooler 12 is connected to the intake manifold 11 with a discharge path 12a therebetween. The discharge path 12a is formed of a metal (for instance, aluminum) in a plate-like shape and is stiffer than the intake manifold 11 formed of resin.

Furthermore, the intercooler 12 is supported by the intake manifold 11, and the discharge path 12a, a coupling structure 100, and the coupling structure 200 are interposed between the intercooler 12 and the intake manifold 11.

The coupling structure 100 includes a projection 110, a securing member 120, and fastening members 130 consisting of bolts. The projection 110 is permanently attached to the intake branch 21c and projects upward from the intake branch 21c. In addition, the projection 110 has bolt holes in its top surface into which the fastening members 130 are threaded. The securing member 120 is formed of a metal (for instance, aluminum) and is fastened to the intercooler 12 with bolts (not illustrated) so as to extend from the right side 12b of the intercooler 12 to the front.

The securing member 120 has through-holes at positions that correspond to the bolt holes formed in the projection 110. The fastening members 130 are inserted through the through-holes formed in the securing member 120 so as to be threaded into the bolt holes formed in the projection 110, thereby securing the intercooler 12 to the intake manifold 11.

The coupling structure 200 includes welding members 210, a coupling member 220, a securing member 230, fastening members 240, 250 consisting of bolts, and a welded member 260. The welding members 210 are formed of resin and are welded to the welded member 260 which is permanently attached to the intake branch 21d. Welding between the welding member 210 and the welded member 260 will be described later in detail.

The welding members 210 are welded to the top of the welded member 260 of the intake branch 21d so as to stand up from the welded member 260 of the intake branch 21d. The welding members 210 have bolt holes formed in their top surfaces into which the fastening members 240 are threaded.

The coupling member 220 is formed of a metal (for instance, aluminum) in a plate-like shape. The coupling member 220 is disposed so as to extend in the front-rear direction. The coupling member 220 has through-holes formed in its front section at positions that correspond to the bolt holes formed in the welding members 210. In addition, the coupling member 220 has a through-hole formed in its rear section at a predetermined position.

The securing member 230 is formed of a metal (for instance, aluminum) and is welded to the intercooler 12 so as to extend leftward from the left side 12c of the intercooler 12. The securing member 230 has a U-shaped cutout that opens rearward at a position that corresponds to the through-hole formed in the rear section of the coupling member 220.

The fastening members 240 are inserted through the through-holes formed in the front section of the coupling member 220 so as to be threaded into the bolt holes of the welding members 210, thereby securing the welding members 210 and the coupling member 220.

The fastening member 250 is inserted through the U-shaped cutout of the securing member 230 and the rear through-hole of the coupling member 220 so as to be fastened by nuts (not illustrated), thereby coupling member 220 and the securing member 230 to each other.

With this arrangement, the coupling structure 200 secures the intercooler 12 to the intake manifold 11.

In the vehicle 1, even if the intercooler 12 exerts an external force on the discharge path 12a and the coupling structure 100 as a result of a collision of the vehicle 1, these components are configured to have stiffness that protects the intake manifold 11 from damage. On the other hand, when the intercooler 12 exerts an external force on the coupling structure 200 as a result of a collision of the vehicle 1, such an external force is likely to cause damage to the intake manifold 11 unless the coupling structure 200 decouples the coupling between the intake manifold 11 and the intercooler 12.

Figure 4A:
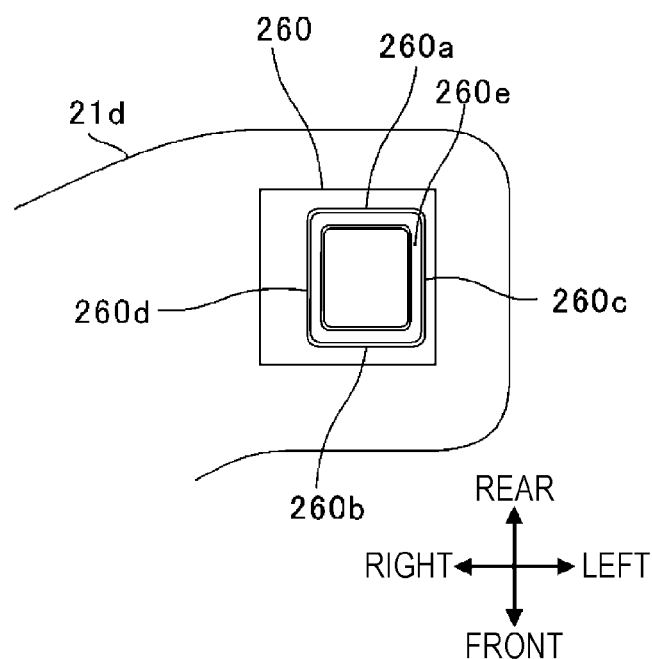
FIGS. 4A, 4B, and 4C are explanatory diagrams illustrating shapes of a welding member and a welded member of an intake manifold (intake branch)
Figure 4B:
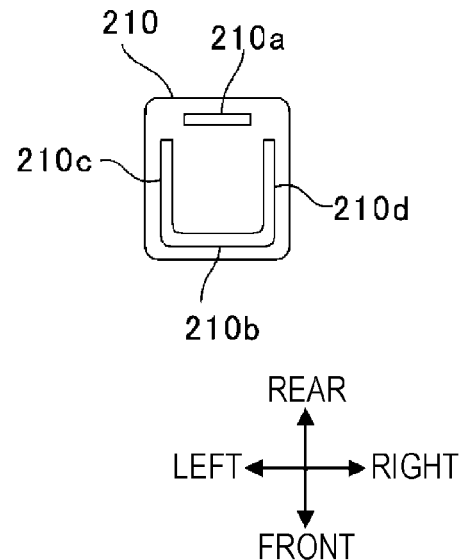
Figure 4C:
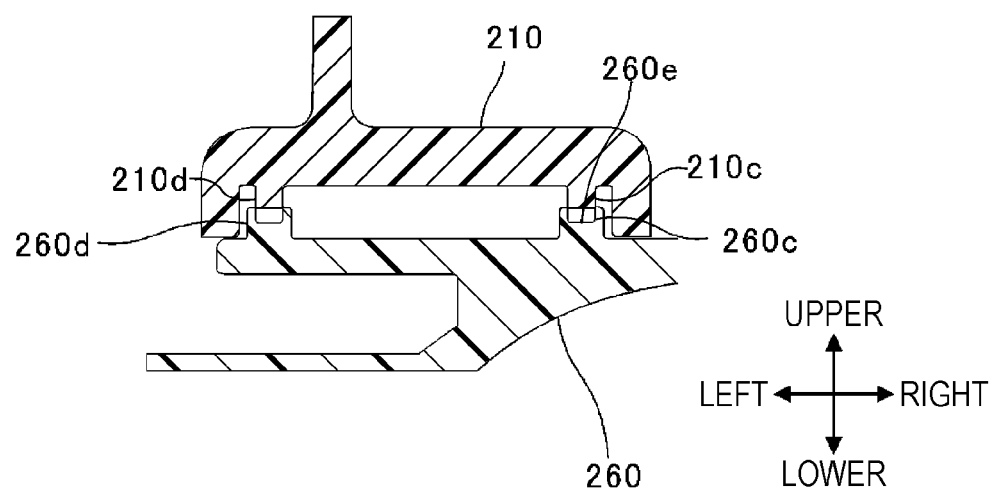

FIGS. 4A and 4B are explanatory diagrams illustrating shapes of the welding members 210 and the welded member 260 of the intake manifold 11 (intake branch 21d). FIG. 4A is a view of the intake branch 21d taken from above. FIG. 4B is a view of the intake branch 21d taken from below. FIG. 4C is a cross-sectional view of the welding members 210 and the welded member 260.

As illustrated in FIGS. 4A and 4C, the welded member 260, as a whole, is formed in a rectangular shape with an opening in the middle thereof. The welded member 260 has welding surfaces 260a through 260d. The welding surface 260a is located on the rear side of the center in the front-rear direction of the welded member 260 so as to extend in the left-right direction. The welding surface 260b is located on the front side of the center in the front-rear direction of the welded member 260 so as to extend in the left-right direction. The welding surface 260c is located on the left side of the center in the left-right direction of the welded member 260 so as to extend in the front-rear direction. The welding surface 260d is located on the right side of the center in the left-right direction of the welded member 260 so as to extend in the front-rear direction.

The welding surfaces 260a through 260d are connected at their ends to one another, thereby creating a substantially rectangular space thereinside. Note that the welding surfaces 260a through 260d project upward and have recesses 260e thereinside.

As illustrated in FIGS. 4B and 4C, the welding member 210 has welding surfaces 210a through 210d facing and welded to the welding surfaces 260a through 260d, respectively. Note that the welding surfaces 210a through 210d project downward.

The welding surfaces 210a through 210d are formed so as to be narrower than the recess 260e. The welding surface 210a (first welding surface) is located on the rear side of the center in the front-rear direction of the welding member 210 so as to extend in the left-right direction (perpendicular to the direction in which an external force is exerted). The welding surface 210b (second welding surface) is located on the front side of the center in the front-rear direction of the welding member 210 so as to extend in the left-right direction. The welding surface 210a is shorter than the welding surface 210b in the left-right direction. In other words, the welding surface 210a has a smaller area than the welding surface 210b.

The welding surface 210C (third welding surface) is connected to the welding surface 210b so as to extend rearward from the left end of the welding surface 210b. The welding surface 210d (fourth welding surface) is connected to the welding surface 210b so as to extend rearward from the right end of the welding surface 210b. In addition, the welding surface 210c and the welding surface 210d have their rear ends located in front of the welding surface 210a. As a result, the welding surface 210c and the welding surface 210d are not connected to the welding surface 210a, but are connected to the welding surface 210b. In other words, the total area of the welding surfaces 210a, 210c, 210d formed on the rear side of the center in the front-rear direction of the welding member 210 is smaller than that of the welding surfaces 210b, 210c, 210d formed on the front side of the center in the front-rear direction of the welding member 210.

After the welding surfaces 210a through 210d are inserted into the recess 260e formed in the welding surfaces 260a through 260d, the welding member 210 is subjected to pressure while being subjected to vibrations, thereby being welded to the welded member 260.

As described above, when an external force is exerted on the intercooler 12 as a result of a collision of the vehicle 1, the intercooler 12 is displaced forward relative to the intake manifold 11. At this time, due to the securing member 230 having a U-shaped cutout that opens rearward, the coupling structure 200 allows the securing member 230 to disengage from the fastening member 250 when the intercooler 12 is displaced forward relative to the intake manifold 11.

This arrangement eliminates the exertion on the intake branch 21d of a forward external force coming from the intercooler 12 via the coupling member 220 and the welding member 210, thereby suppressing the intake branch 21d from being broken.

In some cases, however, the securing member 230 may fail to disengage from the fastening member 250, depending on a tightening force of the fastening member 250 between the coupling member 220 and the securing member 230 or the direction in which the external force is exerted.

If the securing member 230 fails to disengage from the fastening member 250, a forward external force is exerted on the welding member 210 via the securing member 230 and the coupling member 220. If this occurs, such an external force is exerted on the welding surfaces 210a through 210d of the welding member 210 (stress occurs). At this time, the welding surface 210a is located at a rearmost position in the direction in which the external force is exerted. In addition, the welding surface 210a is shorter than the welding surface 210b in the left-right direction and is away from the welding surface 210c and the welding surface 210d, resulting in the external force (stress) concentrating on the welding surface 210a.

If the welding surface 210a is removed from the welding surface 260a due to the external force, the external force (stress) concentrates on rear ends of the welding surface 210c and the welding surface 210d, causing cracks to begin forming at the rear ends of the welding surface 210c and the welding surface 210d. Then, the welding surface 210c and the welding surface 210d are removed from the welding surface 260c and the welding surface 260d, which is followed by the welding surface 210b being from the welding surface 260b.

As described above, the coupling structure 200 has the welding surfaces 210a through 210d that are configured to concentrate stress when subjected to a forward external force. This arrangement causes the removal of the welding surfaces to begin at a portion on which stress concentrates, thereby reducing damage to the intake branch 21d resulting from exertion of an external force.

It is conceivable that the welding surface 210a is not provided in order to cause the stress to concentrate on the rear ends of the welding surface 210c and the welding surface 210d. Accordingly, if the welding surface 210a is not provided, the vibrations of the intercooler 12 resulting from the vibrations of the vehicle 1 cause the stress to concentrate on the rear ends of the welding surface 210c and the welding surface 210d. As a result, the vibrations of the intercooler 12 are likely to cause the welding member 210 to be removed from the welded member 260. This may make it impossible for the intake manifold 11 to support the intercooler 12.

However, in the coupling structure 200 according to the first example, the welding surface 210a that is shorter in the left-right direction than the welding surface 210b that is away from the position on which an external force is exerted is provided on the rear side that is close to the position on which an external force is exerted. This arrangement enables the welding surface 210a to accept stress during normal vibrations, thereby suppressing the welding member 210 from being removed from the welded member 260.

As described above, when subjected to an external force, the coupling structure 200 can protect the intake branch 21d from damage, while ensuring the welding strength of the welding member 210 and the welded member 260.

Second Example

Figure 5A:
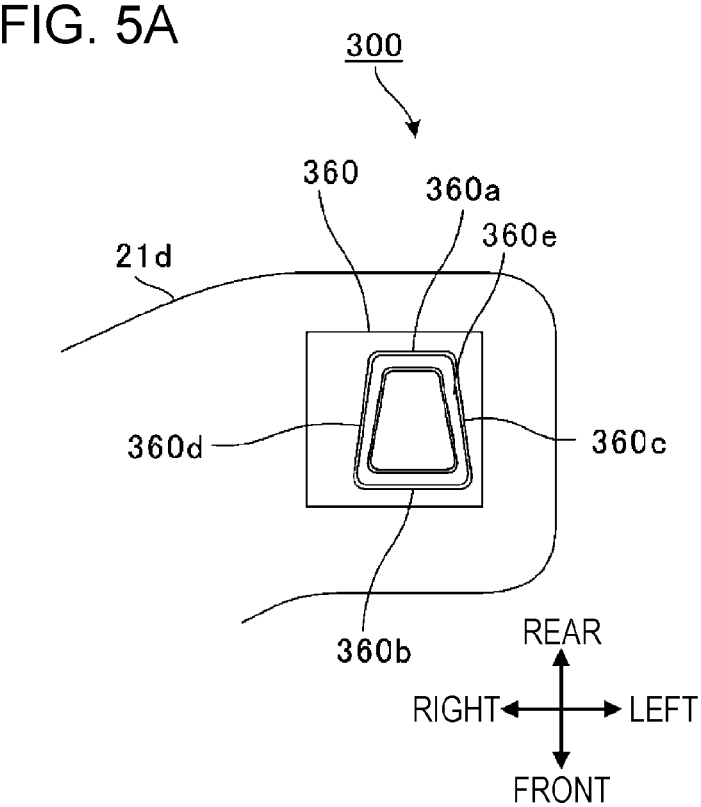
FIGS. 5A and 5B are explanatory diagrams illustrating a coupling structure according to a second example.
Figure 5B:
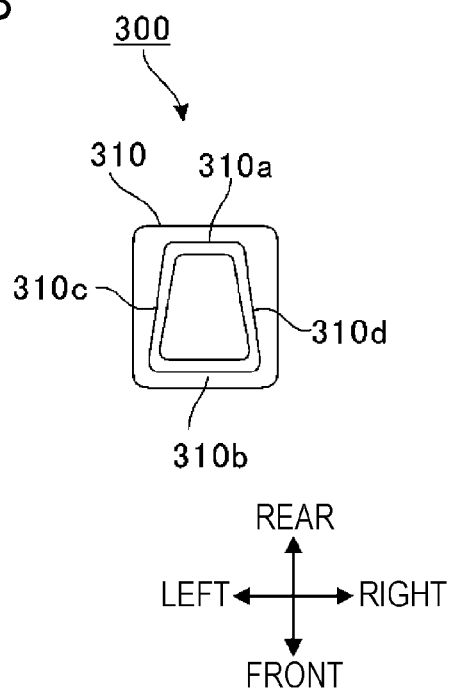

FIGS. 5A and 5B are explanatory diagrams illustrating a coupling structure 300 according to a second example. FIG. 5A is a view of the intake branch 21d taken from above. FIG. 5B is a view of a welding member 310 taken from below. A coupling structure 300 is the same as the coupling structure 200 according to the first example, except that, in place of the welding member 210 and the welded member 260 in the first example, a welding member 310 and a welded member 360 are provided.

As illustrated in FIG. 5A, the welded member 360 as a whole is formed in a trapezoidal shape with an opening in the middle thereof. The welded member 360 has a welding surface 360a that is located on the rear side of the center in the front-rear direction of the welded member 360 so as to extend in the left-right direction and a welding surface 360b that is located on the front side of the center in the front-rear direction of the welded member 360 so as to extend in the left-right direction. The welding surface 360a is shorter than the welding surface 360b in the left-right direction.

A welding surface 360c is formed in a linear shape so as to connect to a left end of the welding surface 360a and a left end of the welding surface 360b. A welding surface 360d is formed in a linear shape so as to connect to a right end of the welding surface 360a and a right end of the welding surface 360b. Note that the welding surfaces 360a through 360d project upward and have recesses 360e thereinside.

As illustrated in FIG. 5B, the welding member 310 as a whole is formed in a trapezoidal shape with an opening in the middle thereof. The welding member 310 has welding surfaces 310a through 310d at positions that face the welding surfaces 360a through 360d, respectively.

Specifically, the welding surface 310a (first welding surface) is located on the rear side of the center in the front-rear direction of the welding member 310 so as to extend in the left-right direction. The welding surface 310b (second welding surface) is located on the front side of the center in the front-rear direction of the welded member 310 so as to extend in the left-right direction. The welding surface 310a is shorter than the welding surface 310b in the left-right direction. In other words, the welding surface 310a has a smaller area than the welding surface 310b.

The welding surface 310c (third welding surface) is formed in a linear shape so as to connect to the left end of the welding surface 310a and the left end of the welding surface 310b. The welding surface 310d (fourth welding surface) is formed in a linear shape so as to connect to the right end of the welding surface 310a and the right end of the welding surface 310b. The welding surfaces 310a through 310d project downward. In other words, the total area of the welding surfaces 310a, 310c, 310d formed on the rear side of the center in the front-rear direction of the welding member 310 is smaller than that of the welding surfaces 310b, 310c, 310d formed on the front side of the center in the front-rear direction of the welding member 310. In addition, the welding surfaces 310a through 310d are formed so as to be narrower than the recess 360e.

Accordingly, if a forward external force is exerted on the welding member 310, such an external force (stress) is concentrated on the welding surface 310a. If the welding surface 310a is removed from the welding surface 360a due to the external force, cracks begin forming at the rear ends of the welding surface 310c and the welding surface 310d. Then, the welding surface 310c and the welding surface 310d are removed from the welding surface 360c and the welding surface 360d, which is followed by the welding surface 310b being from the welding surface 360b.

In the coupling structure 300, the welding surface 310a that is shorter in the left-right direction than the welding surface 310b that is away from the position on which an external force is exerted is provided on the rear side that is close to the position on which an external force is exerted. This arrangement enables the welding surface 310a to accept stress during normal vibrations, thereby suppressing the welding member 310 from being removed from the welded member 360.

As described above, while ensuring the welding strength of the welding member 310 and the welded member 360, the coupling structure 300 can protect the intake branch 21d from damage when subjected to an external force.

Third Example

Figure 6A:
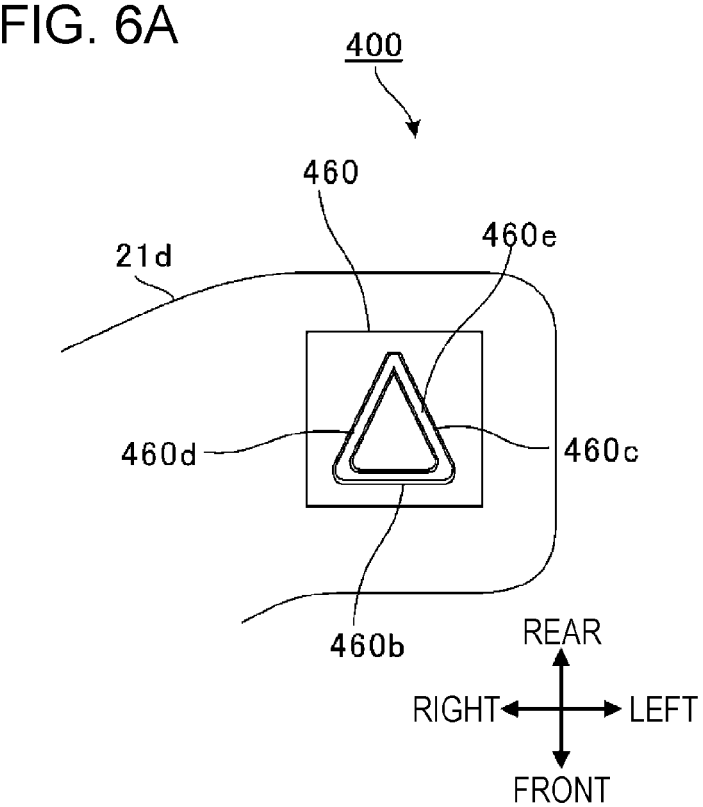
FIGS. 6A and 6B are explanatory diagrams illustrating a coupling structure according to a third example.
Figure 6B:
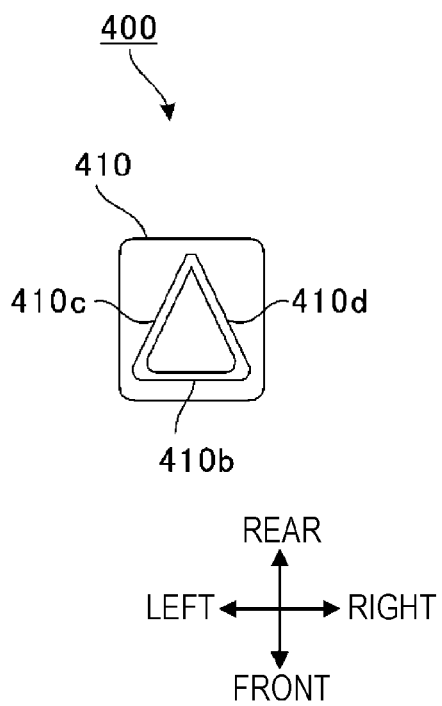

FIGS. 6A and 6B are explanatory diagrams illustrating a coupling structure 400 according to a third example. FIG. 6A is a view of the intake branch 21d taken from above. FIG. 6B is a view of a welding member 410 taken from below. A coupling structure 400 is the same as the coupling structure 200 according to the first example, except that, in place of the welding member 210 and the welded member 260 in the first example, a welding member 410 and a welded member 460 are provided.

As illustrated in FIG. 6A, a welded member 460, as a whole, is formed in a triangular shape with an opening in the middle thereof. The welded member 460 has a welding surface 460b that is located on the front side of the center in the front-rear direction of the welded member 460 so as to extend in the left-right direction. A welding surface 460c and a welding surface 460d are connected at their ends to left and right ends of the welding surface 460b, respectively, and are formed in a linear shape so as to be connected at the other ends to each other. The welding surfaces 460b through 460d project upward and have a recess 460e thereinside.

As illustrated in FIG. 6B, a welding member 410, as a whole, is formed in a triangular shape with an opening in the middle thereof. The welding member 410 has welding surfaces 410b through 410d at positions that face the welding surfaces 460b through 460d, respectively.

Specifically, the welding surface 410b (forward welding surface) is located on the front side of the center in the front-rear direction of the welding member 410 so as to extend in the left-right direction. The welding surface 410c (first side welding surface) and the welding surface 410d (second side welding surface) are connected at their ends to left and right ends of the welding surface 410b, respectively, and are formed in a linear shape so as to be connected at the other ends to each other. Accordingly, the total area of the welding surfaces 410c, 410d formed on the rear side of the center in the front-rear direction of the welding member 410 is smaller than that of the welding surfaces 410b, 410c, 410d formed on the front side of the center in the front-rear direction of the welding member 410. The welding surfaces 410b through 410d project downward. In addition, the welding surfaces 410b through 410d are formed so as to be narrower than the recess 460e.

Accordingly, if a forward external force is exerted on the welding member 410, such an external force (stress) concentrates on rear ends of the welding surface 410c and the welding surface 410d. Then, cracks begin forming at the rear ends of the welding surface 410c and the welding surface 410d. After that, the welding surface 410c and the welding surface 410d are removed from the welding surface 460c and the welding surface 460d, which is followed by the welding surface 410b being removed from the welding surface 460b.

In the coupling structure 400, the rear end of the welding surface 410c and the welding surface 410d that is shorter in the left-right direction than the welding surface 410b that is away from the position on which an external force is exerted is located so as to connect to the rear side that is close to the position on which an external force is exerted. This arrangement enables the rear end of the welding surface 410c and the welding surface 410d to accept stress during normal vibrations, thereby preventing the welding member 410 from being removed from the welded member 460.

As described above, while ensuring the welding strength of the welding member 410 and the welded member 460, the coupling structure 400 can protect the intake branch 21d from damage when subjected to an external force.

With reference to the attached drawings, the present invention is typically described with regard to the foregoing preferred examples, but is not limited to these examples. As is obvious to those skilled in the art, it is needless to say that various modifications are conceivable within the scope of the present invention and that such modifications fall within the technical scope of the present invention.

In the first example described above, the welding surfaces 210a through 210d are provided on the welding member 210, while the welding surfaces 260a through 260d are provided on the welded member 260. However, the welding surfaces 260a through 260d may be provided on the welding member 210, while the welding surfaces 210a through 210d may be provided on the welded member 260. In addition, in the second example, the welding surfaces 360a through 360d may be provided on the welding member 310, while the welding surfaces 310a through 310d may be provided on the welded member 360. Furthermore, in the third example, the welding surfaces 460b through 460d may be provided on the welding member 410, while the welding surfaces 410b through 410d may be provided on the welded member 460.

The coupling structures 200, 300, 400 (welding members 210, 310, 410, and welded members 260, 360, 460) are configured to provide a coupling between the intake manifold 11 and the intercooler 12. However, the coupling structures may be configured to provide a coupling between other components.

The present invention may be used for a coupling structure.

The invention claimed is:

1. A coupling structure of a vehicle, the vehicle comprising:
   an engine compartment accommodating an engine having an intake port;
   a body frame enclosing the engine compartment;
   an intake manifold disposed in the engine compartment, including an intake branch connecting to the intake port, and having a first end closest to the body frame in a rear direction of the vehicle; and
   an intercooler supported by the intake manifold in the engine compartment and having a second end closest to the body frame in the rear direction of the vehicle, the second end being closer to the body frame than the first end of the intake manifold in the rear direction of the vehicle;
   the coupling structure comprising:
   a securing member in the form of a mounting flange extending from the intercooler;
   a coupling member in the form of a mounting link fastened to the securing member;
   a fastener coupling the securing member to the coupling member;
   a resin welding member coupled to the coupling member, wherein the welding member comprises a longitudinally extending welding protrusion having a plurality of projecting sidewalls; and
   a resin welded member comprising a cooperative longitudinally extending welding protrusion having a plurality of cooperative projecting sidewalls, wherein distal ends of the sidewalls of the welding member correspondingly mate with and are welded to distal ends of the sidewalls of the welded member,
   wherein the welded member projects from a main body of the intake branch, such that the intercooler is coupled to a main body of the intake branch via the welding member and the welded member.

2. The coupling structure according to claim 1,
   wherein the plurality of sidewalls of the welding member comprises a first sidewall that is provided on a rear side in a traveling direction second sidewall that is provided a front side in the traveling direction, wherein the first and second sidewalls are welded to the welded member; and
   wherein the first sidewall is smaller than the second sidewall in length perpendicular to the traveling direction.

3. The coupling structure according to claim 2,
   wherein the plurality of sidewalls of the welding member comprises a third sidewall and a fourth sidewall that are welded to the welded member; and
   wherein the third sidewall and the fourth sidewall extend from both ends of the second sidewall toward the first sidewall in the traveling direction.

4. The coupling structure according to claim 3,
   wherein the coupling member extends in a front-rear direction of the vehicle; and
   wherein the securing member has a U-shaped cutout that opens rearward in the front-rear direction at a position at which the securing member is fastened with the fastener.

5. The coupling structure according to claim 2,
   wherein the plurality of sidewalls of the welding member comprises a third sidewall and a fourth sidewall that are welded to the welded member;
   wherein the third sidewall is formed so as to be connected to one end of the first sidewall and one end of the second sidewall; and
   wherein the fourth sidewall is formed so as to be connected to the other end of the first sidewall and the other end of the second sidewall.

6. The coupling structure according to claim 5,
   wherein the coupling member extends in a front-rear direction of the vehicle; and
   wherein the securing member has a U-shaped cutout that opens rearward in the front-rear direction at a position at which the securing member is fastened with the fastener.

7. The coupling structure according to claim 2,
   wherein the coupling member extends in a front-rear direction of the vehicle; and
   wherein the securing member has a U-shaped cutout that opens rearward in the front-rear direction at a position at which the securing member is fastened with the fastener.

8. The coupling structure according to claim 1,
   wherein the plurality of sidewalls of the welding member comprises a forward sidewall that is provided on a front side in a traveling direction that is welded to the welded member, and a first sidewall and a second sidewall of the plurality of sidewalls that are connected to both ends of the forward sidewall and that are connected to each other on a rear side in the traveling direction.

9. The coupling structure according to claim 8,
   wherein the coupling member extends in a front-rear direction of the vehicle; and wherein the securing member has a U-shaped cutout that opens rearward in the front-rear direction at a position at which the securing member is fastened with the fastener.

10. The coupling structure according to claim 1,
wherein the coupling member extends in a front-rear direction of the vehicle; and
wherein the securing member has a U-shaped cutout that opens rearward in the front-rear direction at a position at which the securing member is fastened with the fastener.

11. The coupling structure according to claim 1,
wherein the welding member includes a center in a front-rear direction of the vehicle, a first region of the plurality of sidewalls of the welding member are welded to the welded member on a rear side of the center in the front-rear direction and a second region of the plurality of sidewalls of the welding member are welded to the welded member on a front side of the center in the front-rear direction, and
wherein the distal ends of the plurality of sidewalls of the welding member are received within recesses defined by the distal ends of the plurality of cooperating sidewalls of the welded member.

12. The coupling structure according to claim 1, wherein, in a cross-sectional view of a welded state of the welded member and the welding member, the welded member and the welded member intersect each other in a left-right direction.

\* \* \* \* \*